United States Patent
Moss et al.

(10) Patent No.: US 11,922,141 B2
(45) Date of Patent: Mar. 5, 2024

(54) VOICE AND CHATBOT CONVERSATION BUILDER

(71) Applicant: Walmart Apollo, LLC, Bentonville, AR (US)

(72) Inventors: John Brian Moss, Carlsbad, CA (US); Don Bambico, San Diego, CA (US); Jason Charles Benesch, Santee, CA (US); Snehasish Mukherjee, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 191 days.

(21) Appl. No.: 17/163,161

(22) Filed: Jan. 29, 2021

(65) Prior Publication Data

US 2022/0244925 A1 Aug. 4, 2022

(51) Int. Cl.
| | |
|---|---|
| *G06F 8/34* | (2018.01) |
| *G06F 8/60* | (2018.01) |
| *G10L 15/06* | (2013.01) |
| *G10L 15/183* | (2013.01) |
| *G10L 15/22* | (2006.01) |

(52) U.S. Cl.
CPC .................. *G06F 8/34* (2013.01); *G06F 8/60* (2013.01); *G10L 15/063* (2013.01); *G10L 15/183* (2013.01); *G10L 2015/228* (2013.01)

(58) Field of Classification Search
CPC . G06F 8/34; G06F 8/60; G10L 15/063; G10L 15/183; G10L 2015/228
See application file for complete search history.

(56) References Cited

U.S. PATENT DOCUMENTS

| | | | |
|---|---|---|---|
| 10,984,782 B2* | 4/2021 | Finkelstein | G10L 15/32 |
| 11,436,416 B2* | 9/2022 | Beaver | G06F 16/90332 |
| 11,508,392 B1* | 11/2022 | Sohail | G06Q 30/0631 |
| 2016/0035353 A1* | 2/2016 | Chen | G10L 17/22 |
| | | | 704/235 |
| 2017/0358305 A1* | 12/2017 | Kudurshian | G06F 16/685 |
| 2018/0233139 A1* | 8/2018 | Finkelstein | G10L 25/51 |

(Continued)

FOREIGN PATENT DOCUMENTS

| | | | | |
|---|---|---|---|---|
| JP | 2018077858 A | * | 5/2018 | G06F 17/30442 |
| KR | 20220134050 A | * | 10/2022 | G06F 40/35 |

OTHER PUBLICATIONS

Gupta, "Tutorial: How to deploy an app toproduction with an actual button", 2018, p. 1-9.

(Continued)

*Primary Examiner* — Richemond Dorvil
*Assistant Examiner* — Nadira Sultana
(74) *Attorney, Agent, or Firm* — Morgan, Lewis & Bockius LLP; Manita Rawat

(57) ABSTRACT

Systems and methods are disclosed for a voice/chatbot building system. The voice/chatbot builder may involve receiving an identified intent, receiving a task related to the identified intent, and receiving a response related to both the identified intent and the task. The identified intent, task, and response may form a first conversation. The first conversation may be linked to other conversations to establish contextual relationships among conversations and determine conversation priority. Voice/chatbot building may also train natural language processing machine learning algorithms.

14 Claims, 16 Drawing Sheets

(56) References Cited

U.S. PATENT DOCUMENTS

| | | | |
|---|---|---|---|
| 2019/0103095 A1* | 4/2019 | Singaraju | G06F 16/35 |
| 2019/0124020 A1 | 4/2019 | Bobbarjung et al. | |
| 2019/0138600 A1 | 5/2019 | Krishnan et al. | |
| 2020/0007380 A1* | 1/2020 | Chen | H04L 51/02 |
| 2020/0257857 A1* | 8/2020 | Peper | G06N 7/005 |
| 2020/0342868 A1* | 10/2020 | Lou | G10L 15/22 |
| 2020/0344185 A1 | 10/2020 | Singaraju et al. | |
| 2021/0150385 A1* | 5/2021 | Mallette | G06F 16/3329 |
| 2021/0350263 A1* | 11/2021 | Koneru | G06N 20/00 |
| 2022/0165256 A1* | 5/2022 | Maheswaran | G10L 13/08 |

OTHER PUBLICATIONS

Shahid, "Building a Chatbot with Google DialogFlow", 2020, p. 1-9.

* cited by examiner

VOICE AND CHATBOT CONVERSATION BUILDER

TECHNICAL FIELD

The disclosure relates generally to systems and methods for conversation building tools for chatbots, voice bots, virtual personal assistants, etc.

BACKGROUND

Voice/chatbots are conversational applications that often plug into other applications and services (e.g., virtual personal assistants, schedulers, reminders, ordering systems, retail websites etc.). These voice/chatbots provide to the user a communication interface to these other applications and services that attempts to provide an interaction that mimics the experience of interacting with a real person. Giving the recent rapid growth in the number of applications and services utilizing voice/chatbots and the diversity domains in which voice/chatbots are being deployed (e.g., health services, retail sector, entertainment services, etc.), there is an ever-increasing need for tools that build voice/chatbot conversations in an efficient and effective manner.

SUMMARY

As disclosed in the various embodiments provided herein, a voice/chatbot conversation builder tool is described. The voice/chatbot conversation builder tool enables developers to deploy conversational applications in an efficient and effective manner. This efficiency and effectiveness are achieved, in part, through the use of innovative graphical user interface ("GUI") that supports the needs of both technical and non-technical application developers. The intuitive and easy-to-use interface achieves this greater efficiency and effectiveness while providing full-featured functionality including, among others, natural language processing (NLP) machine learning algorithms and training of the same, user-intent processing via pluggable, domain-specific conversational modules, creating diverse and dynamic conversations flows, staging and deploying conversation flow updates, performing regression testing, and onboarding of projections and applications onto the conversation builder platform. The conversation builder tool enables developers to onboard, train, design, test, iterate, integrate, launch, and optimize for web and app-based conversation applications via a no-code interface. As exemplified by the embodiments of disclosed herein, the conversations builder tool provides improvements over prior code and waterfall-based systems by providing an interface that enables the implementation and contextualization linking of conversations (which may be referred to as a conversation flow) in ways not previously possible, leading to less redundant and/or repetitive conversation flows, improved system processing time, and use of fewer resources while achieving a more effective conversation program. Additionally, the conversations builder tool adds more expressive capability to dialog state tracking technology, which is typically modeled as a fully observed or partially observed Markov Decision Process ("MDP") that is susceptible to stochastic fluctuations. The conversations builder tool instead models this as a deterministic Finite State Machine ("FSM") which gives the user experience ("UX") designer total and deterministic control over the conversation. Furthermore, the MDP (of prior systems) is a reinforcement learning technique that uses dynamic programming over computationally expensive simulations to generate solutions, while FSM techniques of the present conversation builder tool neither require extra data, nor any simulation or extra computational resources and while retaining the ability to work right out of the box.

In accordance with some embodiments, a system comprising a computing device is provided. The computing device may be configured to receive an identified intent, a task related to the identified intent, and a response related to both the identified intent and the task. The device may be further configured to link the identified intent, task, and response to form a first conversation. The first conversation may be linked with other conversations to provide contextual connections therewith. In some embodiments, the device may be further configured to prioritize a contextually-connected conversation over a non-contextually connected conversation. In some embodiments, the device may be further configured to train a machine learning algorithm configured to determine a user intent from a user utterance. In some embodiments, the device may be further configured to export data related to a task to a remote handler for task processing.

In accordance with some embodiments, a method is provided. The method may comprise receiving an identified intent, a task related to the identified intent, and a response related to both the identified intent and the task. The method may further comprise to linking the identified intent, task, and response to form a first conversation. The first conversation may be linked with other conversations to provide contextual connections therewith.

In accordance with some embodiments, a non-transitory computer readable medium having instructions stored thereon is provided. The instructions when executed by at least one processor, may cause a device to perform operations comprising receiving an identified intent, a task related to the identified intent, and a response related to both the identified intent and the task. The instructors may further cause the linking of the identified intent, task, and response to form a first conversation. The first conversation may be linked with other conversations to provide contextual connections therewith.

BRIEF DESCRIPTION OF THE DRAWINGS

The features and advantages of the present disclosures will be more fully disclosed in, or rendered apparent by the following detailed descriptions of example embodiments. The detailed descriptions of the example embodiments are to be considered together with the accompanying drawings wherein like numbers refer to like parts and further wherein.

DETAILED DESCRIPTION

Figure 1:
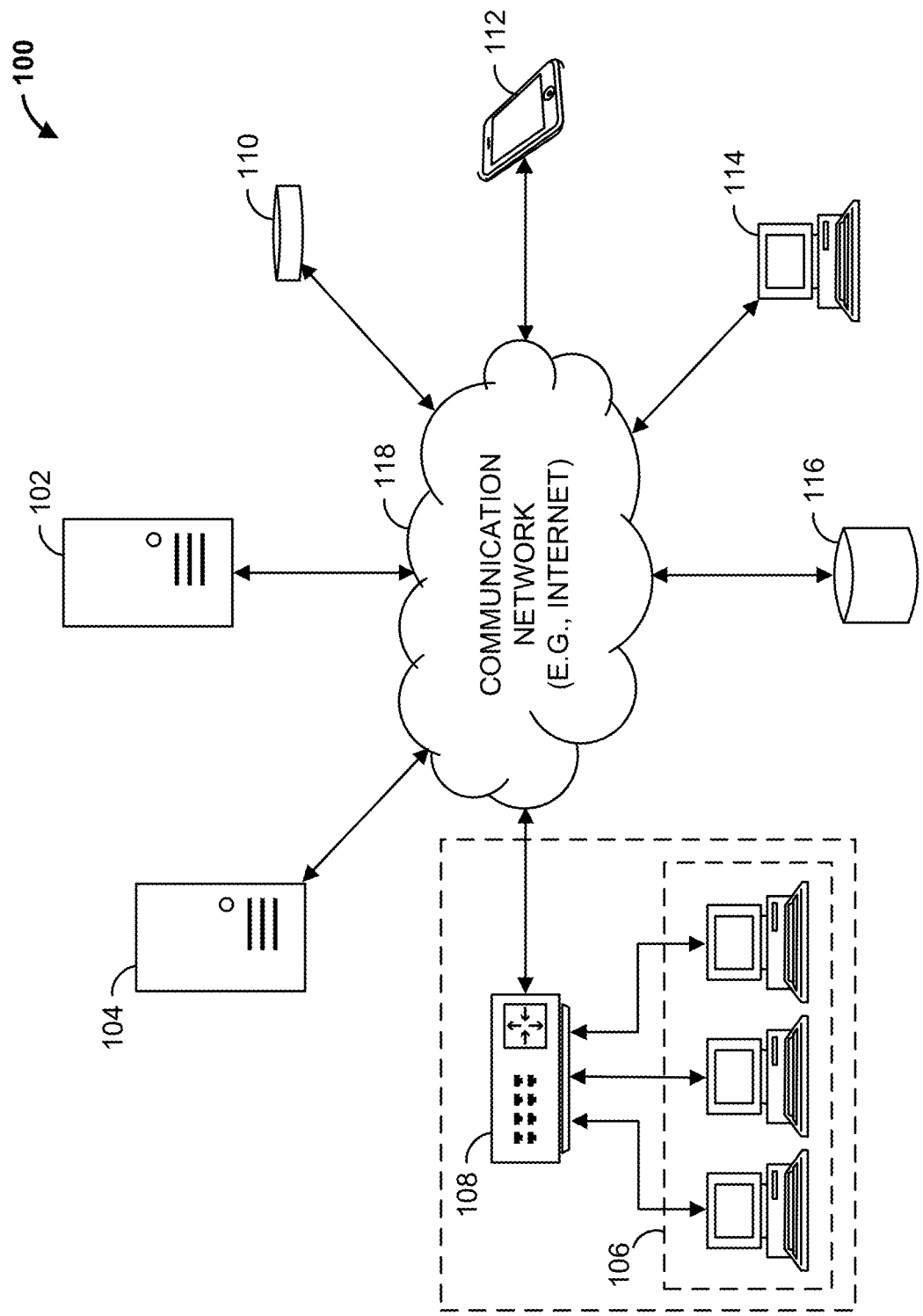
FIG. 1 is block diagram of a voice/chatbot system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates voice/chatbot system 100 in accordance with some embodiments. The voice/chatbot system 100 may include a voice/chatbot builder system 102 (e.g., a computing system), a web server 104, workstation(s) 106, database 116, and multiple customer computing devices 110, 112, 114 operatively coupled over network 118 (which may include and/or provide access to the Internet).

Voice/chatbot builder system 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, voice/chatbot builder system 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, voice/chatbot builder system 102 and web server 104 are operated by a single entity (e.g., a web services company or a retailer), and multiple customer computing devices 112, 114 are operated by customers of the retailer. In some embodiments, voice/chatbot builder system 102 and web server 104 are operated by different entities, wherein the web server is a customer of the services provided by the voice/chatbot builder system 102 and the multiple customer computing devices 112, 114 are operated by customers of the web server 104.

Although FIG. 1 illustrates three customer computing devices 110, 112, 114, voice/chatbot system 100 can include any number of customer computing devices 110, 112, 114. Similarly, voice/chatbot system 100 can include any number of workstation(s) 106, web servers 104, and databases 116.

Workstation(s) 106 is operably coupled to communication network 118 via router (or switch) 108. Workstation(s) 106 and/or router 108 may be located remotely from the voice/chatbot builder system 102, for example. Workstation(s) 106 can communicate with voice/chatbot builder system 102 over communication network 118. The workstation(s) 106 may send data to, and receive data from, voice/chatbot builder system 102. For example, the workstation(s) 106 may transmit data related to the building, training, development, testing, and/or deployment of a conversations that is built using the services provided voice/chatbot builder system 102. In some embodiments, the conversations application program as built using voice/chatbot builder system 102 may be implemented on web server 104 for subsequent use by users.

In some examples, web server 104 hosts one or more websites, such as a health provider's or retailer's website. Customers, via one or more customer computing devices 110, 112, 114, may access the website, which may allow customers to view services, products, schedules, etc. The website may allow customers to add items to an online shopping cart, and purchase the items within the online shopping cart, schedule medical procedures, browse offered service, etc. Further, the website may include voice/chatbot applications with which users may interact. Such voice/chatbot applications may be able to determine user intents, answer questions, schedule services, buy products, etc. In some embodiments, the voice/chatbot application used by web server 104 may implement NLP machine learning (ML) to determine the user intent from the user utterance or text. From these intents the voice/chatbot application may perform additional tasks and provide responses to users.

Voice/chatbot builder system 102 is operable to communicate with database 116 over communication network 118. For example, Voice/chatbot builder system 102 can store data to, and read data from, database 116. Database 116 can be a remote storage device, such as a cloud-based server, a disk (e.g., a hard disk), a memory device on another application server, a networked computer, or any other suitable remote storage. Although shown remote to voice/chatbot builder system 102, in some examples, database 116 can be a local storage device, such as a hard drive, a non-volatile memory, or a USB stick. In some examples, database 116 stores one or more machine learning models and/or training data that may accessed and implemented into a conversation flow by voice/chatbot builder system 102. These machine learning models (e.g., algorithms) may include, for example, Generative Adversarial Networks (GANs), decision tree models, neural networks (e.g., ANNs, CNNs), support vector machines, or any other suitable machine learning models, such as Meta Learners.

Communication network 118 can be a WiFi network, a cellular network a Bluetooth network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Voice/chatbot builder system 102 is operable to define, build, create, train, test, stage, deploy and modify voice/chatbot application conversations that take a user utterance (or text), determine the user intent, perform tasks, and provide a response to a user. As an example, a user may query a voice/chatbot application for the nearest location of a store. The voice/chatbot application may, using NLP ML, determine that the user's intent is to find the nearest location, determine the information needed to answer the questions (e.g., the user's location and store locations), seek any information that is missing (e.g., ask for the user's zip code or ask the user to confirm a location presumed based on the user's IP address), and return a response based on that information (i.e., the closest store). Voice/chatbot builder system 102 enables application developers and/or websites (e.g., server 104) to build/have built these voice/chatbot application programs in an efficient, effective, and intuitive manner that does not require coding knowledge.

As discussed above, NLP ML may be implemented by the voice/chatbot builder system 102 in order to integrate NLP ML into conversation flows utilized by voice/chatbot applications. Voice/chatbot builder system 102 may train NLP ML models using training data, to learn a distribution of, e.g., user intents.

Figure 2:
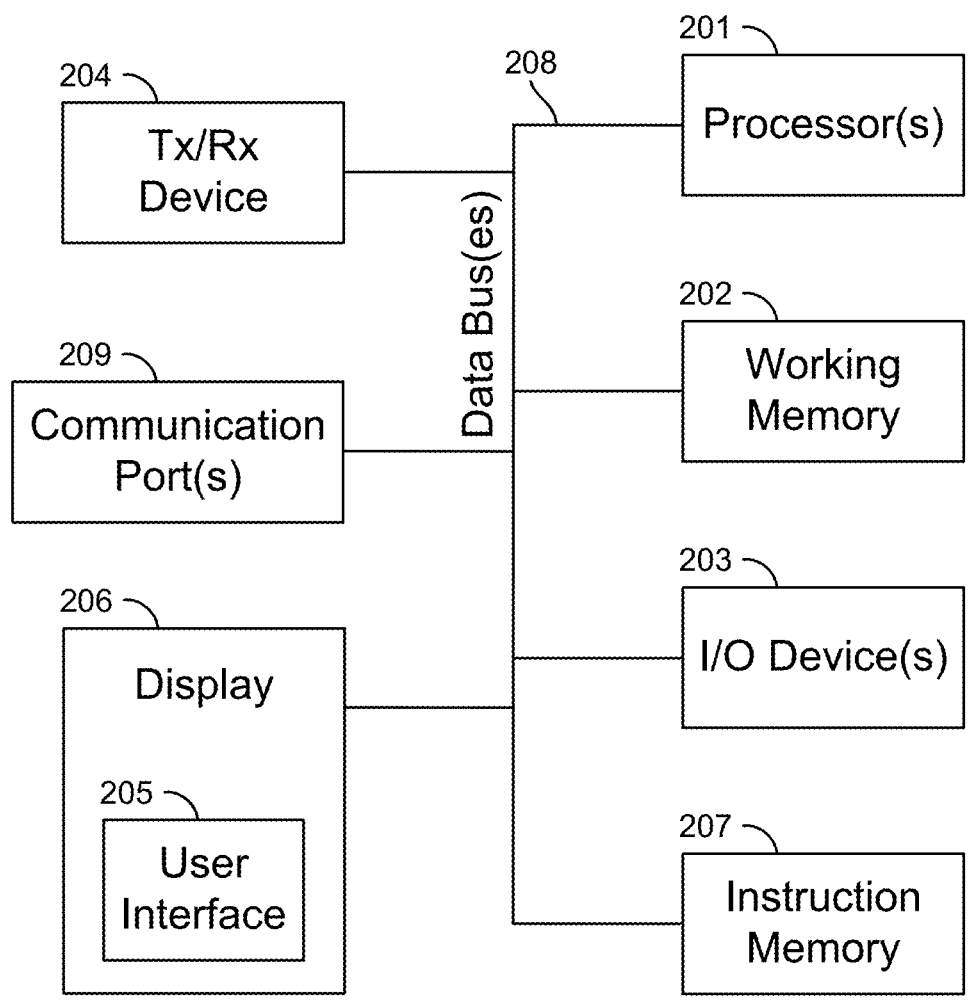
FIG. 2 is a block diagram of the voice/chatbot builder system of voice/chatbot system of FIG. 1 in accordance with some embodiments.

FIG. 2 illustrates the voice/chatbot builder system 102 of FIG. 1 in accordance with some embodiments. Voice/chatbot builder system 102 may include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 may store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of voice/chatbot builder system 102. Working memory 202 can be a random-access memory (RAM) such as a static random-access memory (SRAM) or dynamic random-access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data and an NLU/NLP model.

Display 206 can display user interface 205. User interfaces 205 can enable user interaction with voice/chatbot builder system 102. For example, user interface 205 can be a user interface for defining, building, training, testing, deploying, and making iterative changes to a programmed conversations flow built on the voice/chatbot builder system 102 for application by, e.g., web server 104. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 voice/chatbot builder system 102 will be operating in. Processor(s) 201 is operable to receive data from, or send data to, a network, such as communication network 118 of FIG. 1, via transceiver 204.

Figure 3:
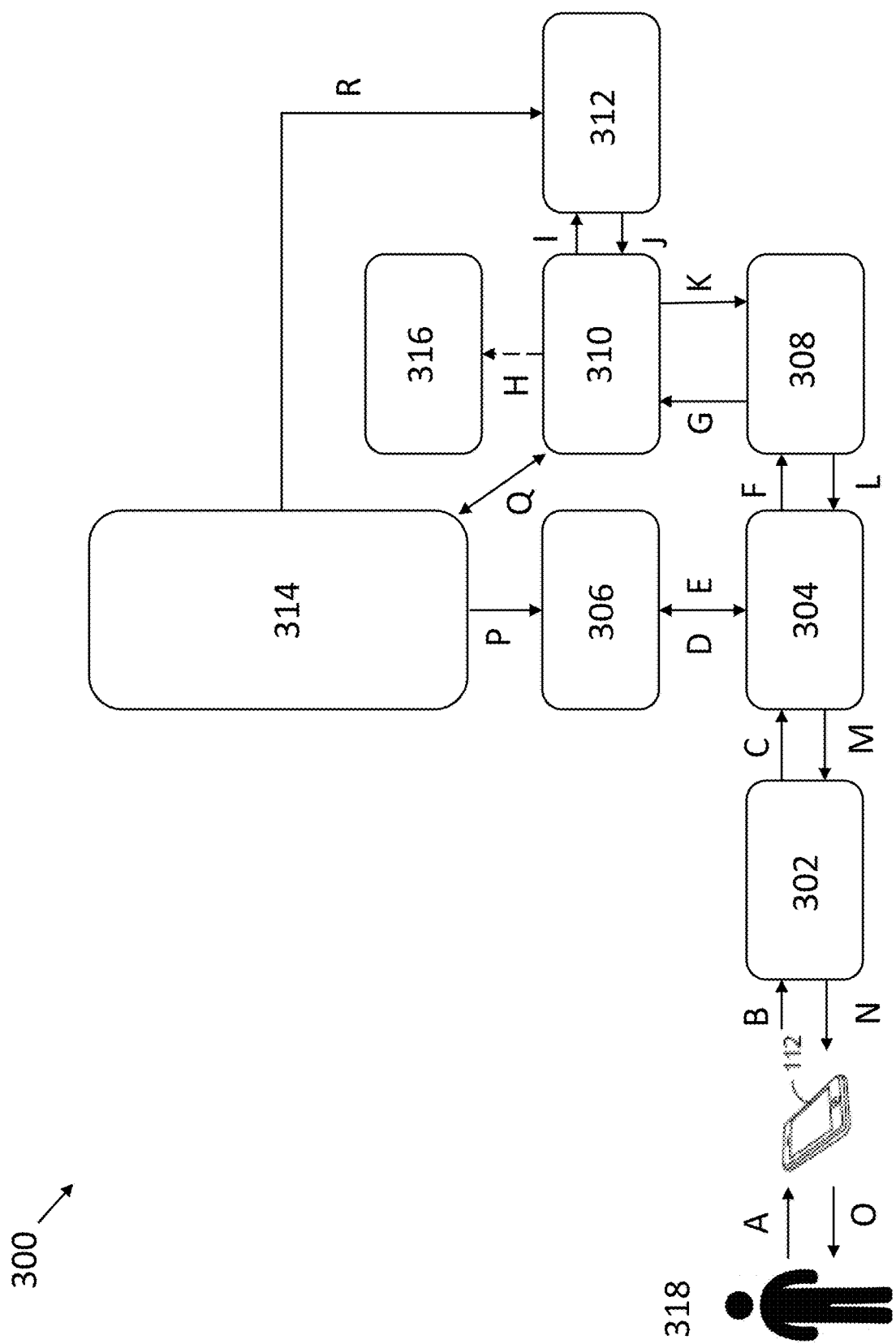
FIG. 3 is a backend architecture of a voice/chatbot system in accordance with some embodiments.

In accordance with some embodiments, voice/chatbot builder system 102 may be part of the back-end architecture 300 of voice/chatbot system 100 as illustrated in FIG. 3. Architecture 300 may comprise an application interface ("API") gateway 302, a voice/chatbot application executor 304, an NLP 306 that may employ ML, an intent processor 308, a task implementer 310, a response generator 312, and voice tooling architecture 314 (e.g., a voice/chatbot builder system). Each component 302-314 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. As stated above, voice/chatbot builder system 102 may be part of, for example, voice tooling architecture 314, as may be database 116 and workstations 106.

In operation, a user 318 may provide a voice or text command (e.g., a user utterance) to a smart device, which may be the customer computing devices 112 as described above as indicated at 'A'. Next, at 'B', a textualized version of the command at 'A' is transmitted to API gateway 302, which in turn transmits the command to the application executor 304 at 'C'. Recognizing that this command is a user utterance, application executor 304 transmits the command to the NLP 306 to interpret the user's intent using NLP ML at 'D'. The interpreted intent is returned at 'E' and forwarded, along with other arguments within the command, to the intent processor at 'F'. At 'G', the intent processor 308 transmits the data to the task implementer 310, which performs the tasks (or series of tasks) within the command, or transmits the task to remote handler 316 to perform the task at 'H'. This information is passed to the response generator 312 at 'I' which generates the response which is returned to the user at 'J'-'O'. Voice tooling architecture 314 may provide NLP training data and intent recognition to NLP 306 at 'P', task definition to task implementer 310 at 'Q', and the appropriate response(s) to response generator 312 at 'R'.

Figure 4:
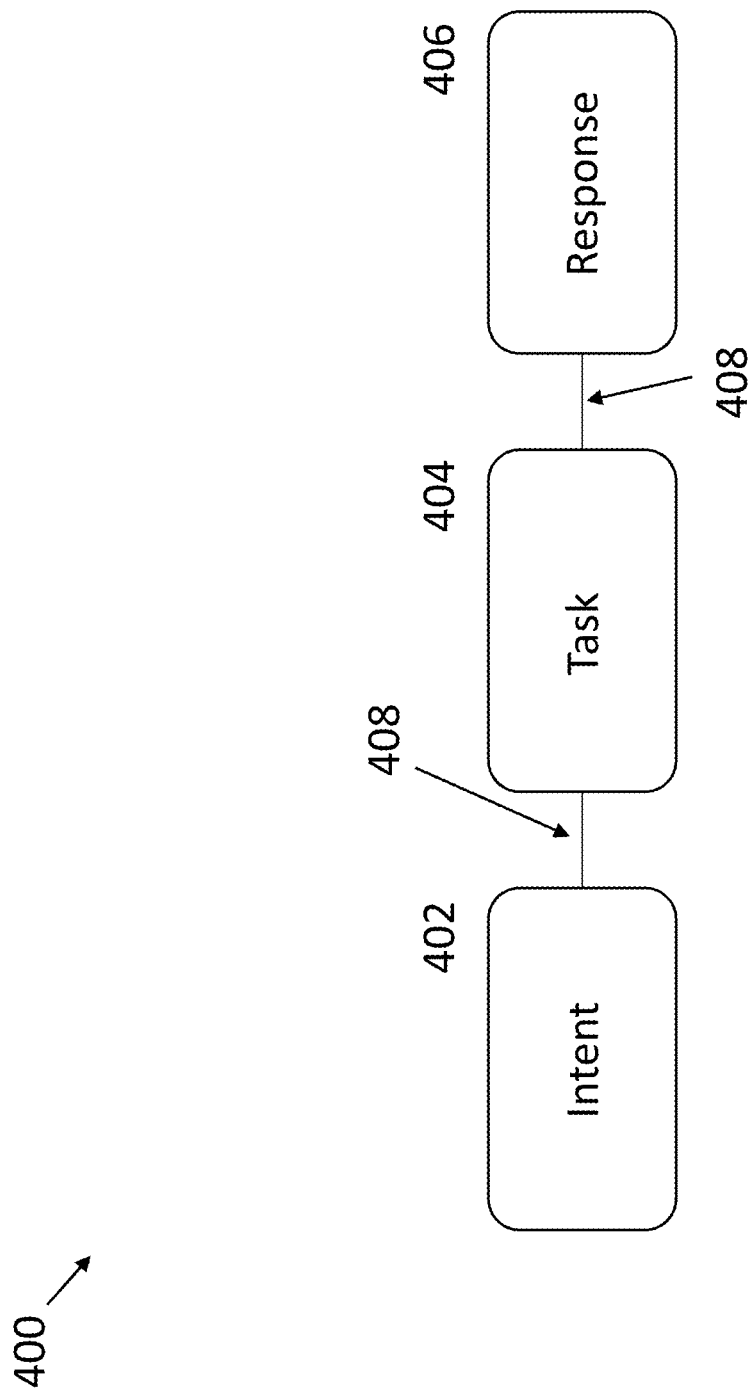
FIG. 4 is an exemplary conversation in accordance with some embodiment.

Voice/chatbot builder system 102 is used to define, build, train, test, and deploy voice/chatbots with conversations flows. An example conversation 400 in accordance with some embodiments is illustrated in FIG. 4. A conversation 400 may include and intent 402, a task 404, and a response 406. Intent 402 is the intent of the user as interpreted by the voice/chatbots application, typically using NLP ML to determine the likely intent based on a user utterance. When an NLP identifies the user's intent, this information is used to locate the appropriate intent 402 that then identifies the conversation 400 defined by the developer using the voice/chatbot builder system 102. Task 404 is a process to be executed by the voice/chatbots application, a task implementer, or a remote task handler in this conversation flow. This task takes the provided intent and associated arguments (e.g., slots that identifying objects (services, locations, products, etc.)) and processes them in some manner. For example, the task may be to locate a store nearest the user based on the provided (or subsequently requested) information. Response 406 takes the output of the task 404 and generates an appropriate response. In some embodiments, a task may be "null." For example, in the initial stages of a conversion, the conversation flow may simply direct that a welcome message be provided to the user.

Conversation 400 also contains links 408 providing a visual indication of the relationship between the various components of the conversation, and to indicate a processing "flow" between the components comprising the conversation 400. Such links 408 may also be used to tie to other conversations. For example, a link (not shown) may be provided between the response 406 and a subsequent intent (not shown) of another conversation. Such links are utilized to indicate, and enforce, contextual ties between different portions of a conversations occurring with a user. For example, a user may inquire about store hours after asking about the closest store. By linking the "store hour" conversation to the "closest store" conversation, the voice/chatbot application would recognize the context in which the inquiry regarding store hours was asked and provide the hours of the closest store previously provided. In some embodiments, the voice/chatbot application may prioritize (contextually) linked conversations 400 when determining what intent the user intended to convey.

As stated above, voice/chatbot builder system 102 provides a user interface that provides a more effective and efficient means to define, build, train, test, deploy and modify voice/chatbot applications in a manner that results in more efficient processing of the same. FIGS. 5A-5J illustrate several of these interfaces in accordance with some embodiments.

Figure 5A:
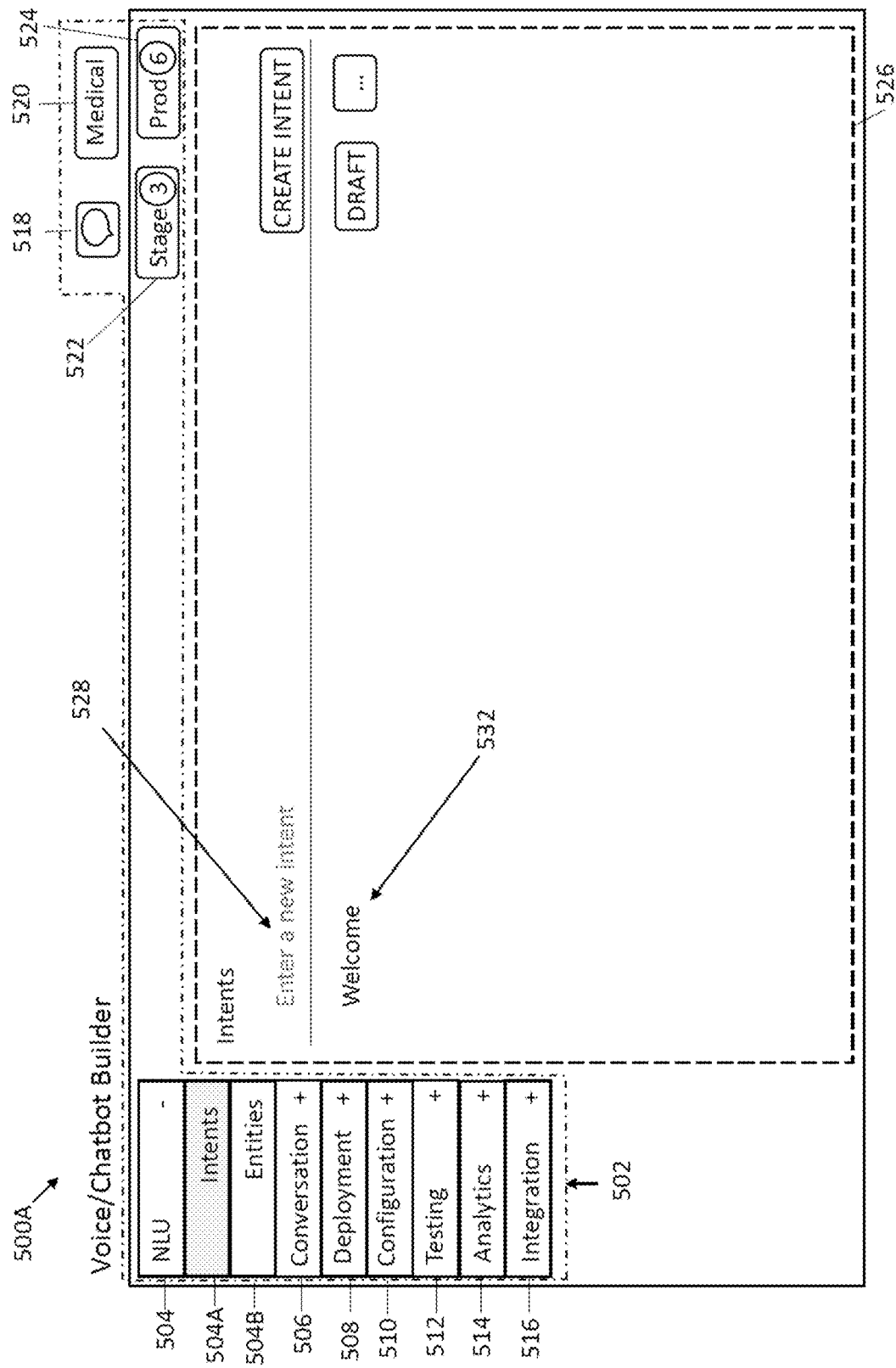
FIG. 5A is an intent-defining interface of a voice/chatbot builder system in accordance with some embodiments.

Turning to FIG. 5A, an intent-defining interface 500A of a voice/chatbot builder system 102 in accordance with some embodiments is illustrated. Intent-defining interface 500A comprises elements that may be common to other interfaces of the voice/chatbot builder system 102. For example, intent-defining interface 500A comprises navigation links and icons (designated within the section labeled 502) including: NLP link 504 (including intent link 504a and entity link 504b); conversation builder link 506; deployment link 508; configuration link 510; testing link 512; analytics link 514; integration link 516; voice/chatbot link 518; staging link 522; and production link 524. The interface may also include a domain indication 520 that informs the user of the particular domain in which work is being performed. Domains influence, e.g., intents as the same word may be different meanings in different contexts. Icons may also contain a status, e.g., both the stage icon 522 and production icon 524 indicate the total number of items that have been staged or produced, respectively.

Intent-defining interface 500A also includes intent-defining window 526. Within window 526 a user is provided an intent-defining field 528 in which new intents can be entered and defined. A defined-intent list 532 is also provided of already (or partially) defined intents. These intents, when deployed, are utilized by the NLP ML to determine a user's intent from an utterance which then is used to define the subsequent conversation had by the user.

Figure 5B:
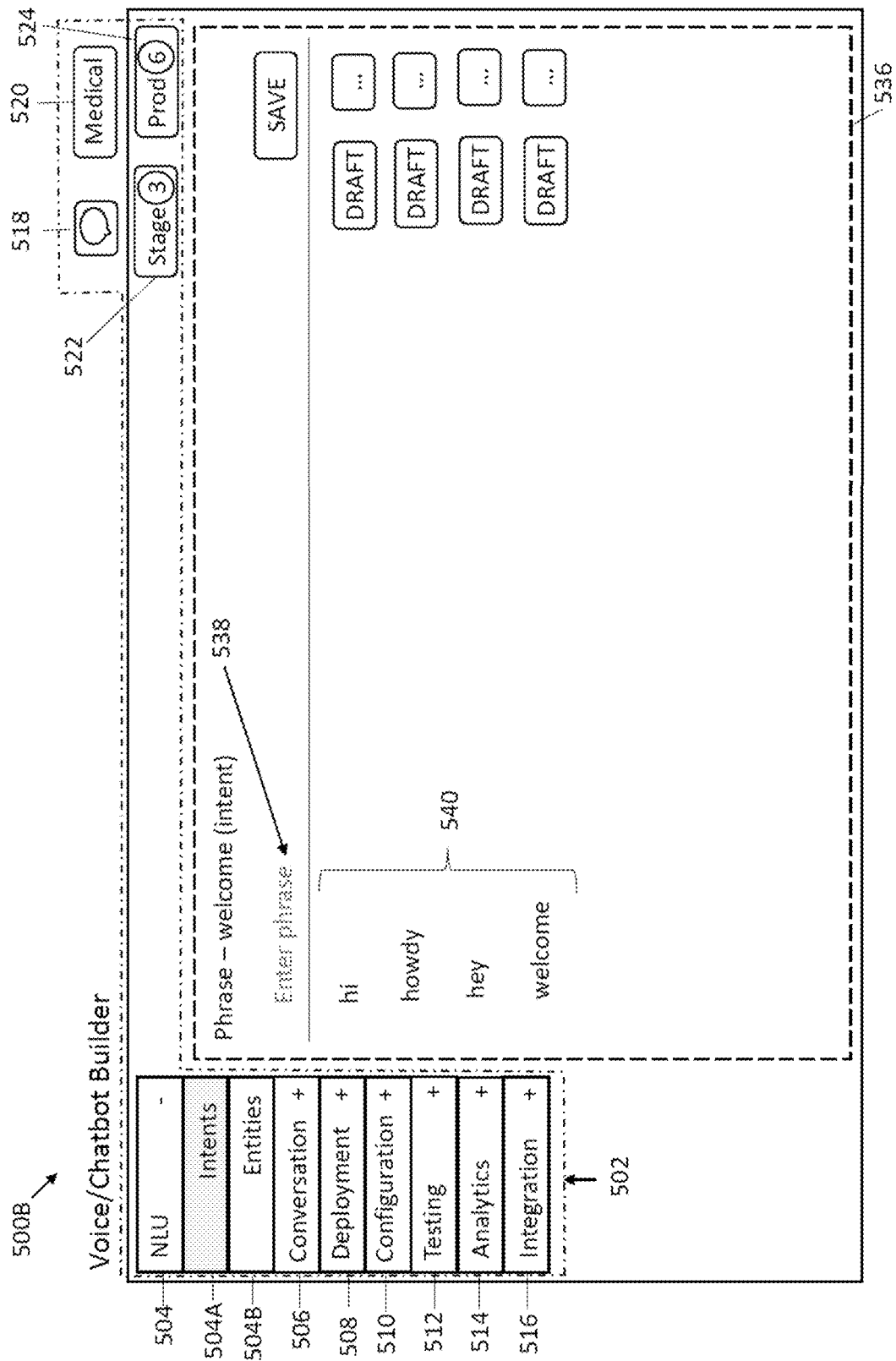
FIG. 5B is a phrase-defining interface of a voice/chatbot builder system in accordance with some embodiments.

In addition to naming these intents in intent-defining interface 500A, training data may be entered that may be used by the NLP ML to help identify a defined intent within a user utterance. Such data may be entered using phrase-defining interface 500B. A phrase-defining interface 500B in accordance with some embodiments is illustrated in FIG. 5B. Phrase-defining interface 500B includes a phrase-defining window 536 that enables a user to enter words in phrase field 538 that the user wishes pair with the selected defined intent. Here, for example, the "welcome" intent shown in FIG. 5A was selected, leading to the phrase-defining window 536 for this welcome intent. The user may populate a series of phrases which are then added to the defined-phrase list 540. In accordance with some embodiments, a user may not need to enter individual phrases, but may instead enter regular expressions that describe a wide range of possible sentences such as 560 as shown in FIG. 5H. In either case, the phrase list 540 or existing data 560 is provided to the NLP ML algorithms for training to ensure that the intent from a user utterance is correctly identified. The existing data 560 may be contained in, e.g., database 116.

Figure 5C:
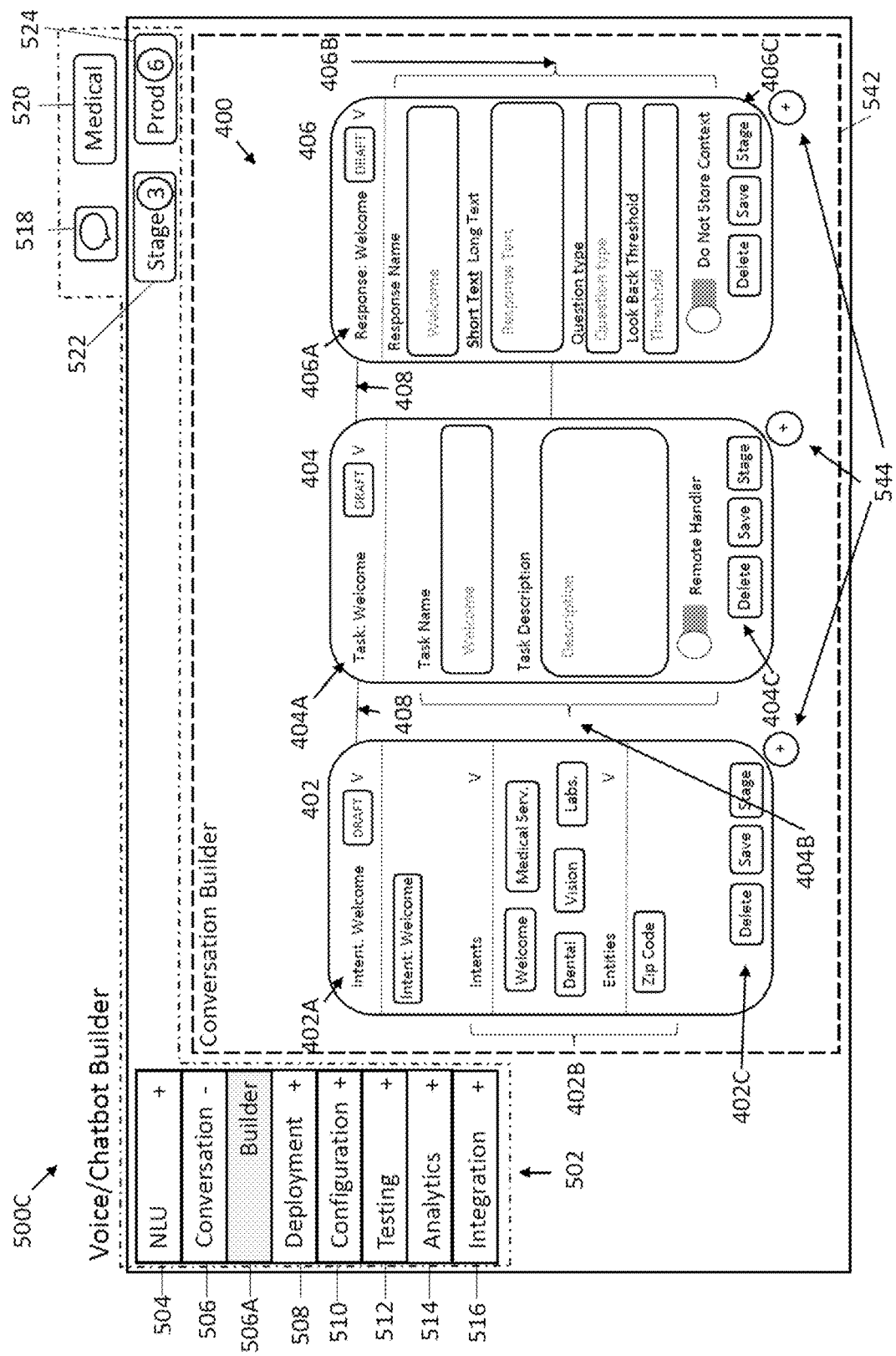
FIG. 5C is a conversation building interface of a voice/chatbot builder system in accordance with some embodiments.

With an intent(s) defined, a user can begin building conversation's using the conversation building interface 500C of some embodiments as illustrated in FIG. 5C. Conversation building interface 500C includes a conversation building window 542 into which the use may enter one or more conversations 400, thereby causing the conversations 400 (and associated components) to be received by the system. These conversations may comprise an intent 402, task 404, and response 406 as described elsewhere herein. Additionally, each of these components of conversation 400 may including various sections that enable the efficient and effective building of conversations for voice/chatbot applications. For example, intent 402 may comprise a status section 402A, an intent selection section 402B, and an operation section 402C. Status section 402A may indicate the selected intent, and may provide this indication when the various sections are collapsed. Intent selection section 402B may provide a list of defined intents that may be selected by the developer. For example, the previously discussed "welcome" intent is shown and may be selected. Selecting the "welcome" intent will enable the voice/chatbot program to identify the correct task 404 and response 406 that is appropriate for the user intent as identified by the NLP ML algorithm from a user utterance. Additionally, entities may also be selected. Finally, operation section 402C allows a user to delete, save, or select the intent 402 to be staged (described in more detail later).

Like intent 402, the task 404 of conversation 400 also contains a status section 404A and operational section 404C that operate similarly to the corresponding sections for the intent 402. Task 404 contains a task-defining section 404B. This section 404B allows selection of the task by name and entering a description thereof. Additionally, a user may select in section 404B for a remote handler to process the task because the task may be one performed by an application separate from the voice/chatbot application. For example, the voice/chatbot application may reach out to a remote handler to determine the closest store to a user based on already provided (or subsequently requested) information from the user.

Response 406 takes data as processed by task 404 and generates a response to be provided to a user. To define response, a response-defining section 406B is provided (response 406 also includes a status section 406A and operation section 406C that operate similarly to the corresponding sections of intent 402). Response-defining section 406B allows the text of the response (both long and short forms) to be entered, definition of any responsive question type, set a "look back interval" which may affect the extent to which the voice/chatbot application will look to prior data for determining the context of the response, and the option to store the particular context of this conversation 400.

Intent 402, task 404, and response 406 of conversation 400 may be associated with one another using the graphically links 408. This association between intents, tasks, and responses is used by the voice/chatbot builder system 102 to convert the conversation 400 as defined by the developer into the code necessary for execution by the processor running the voice/chatbot application. Links 408 may also provide a means to contextually link conversations 400 and determine the priority by which detected user intents are processed as explained below. Links 408 may be selected by clicking on the "plus" icon 544.

In some embodiments, each of the intent selection section 402B, task-defining section 404B, and response-defining section 406B may employ Boolean operators that determine which intent(s), task(s) and response(s) are selected by the voice/chatbot application.

Link 506A provides access to the conversation builder shown in FIG. 5C.

Figure 5D:
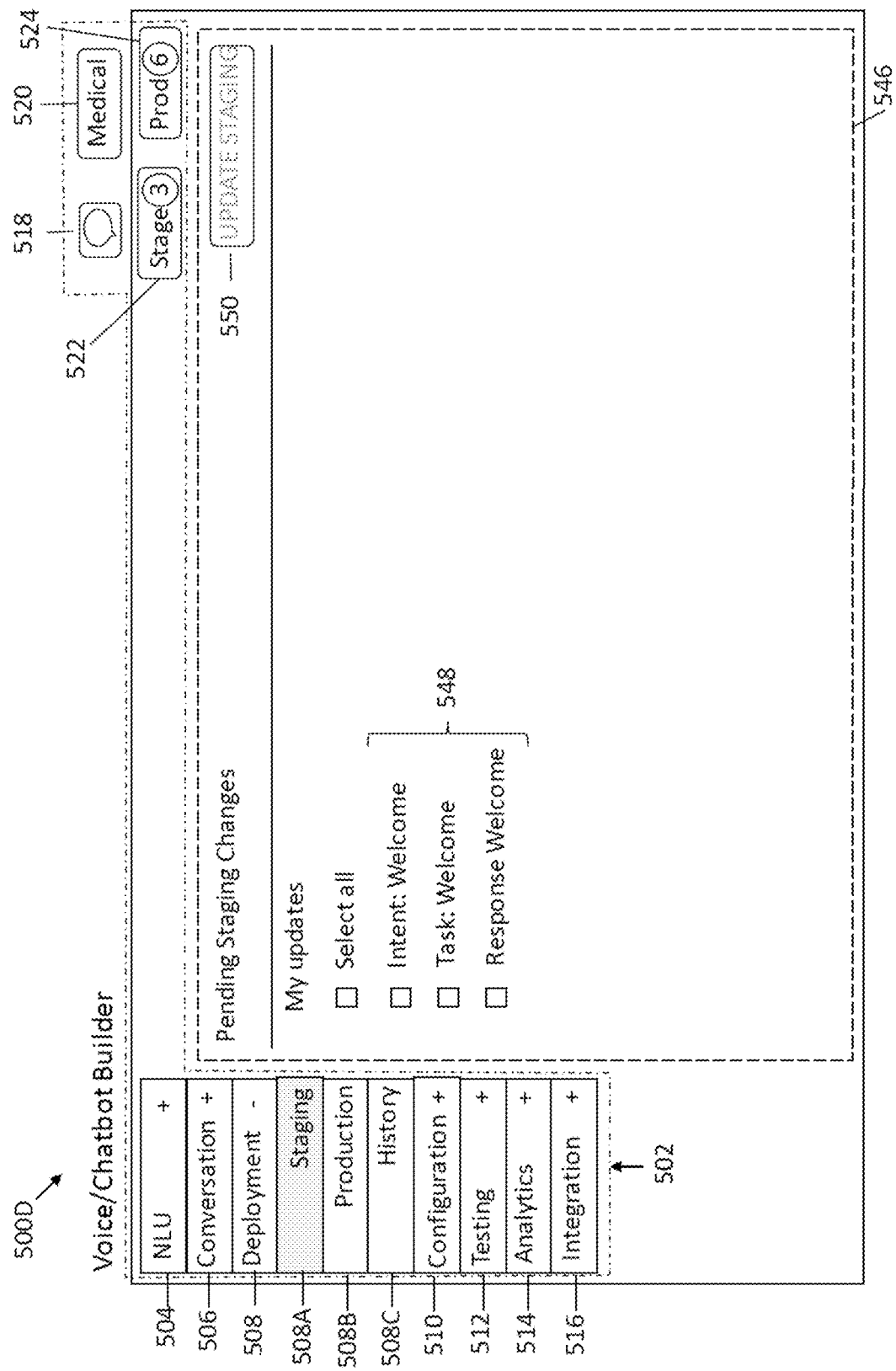
FIGS. 5D-5F are staging interfaces of a voice/chatbot builder system in accordance with some embodiments.
Figure 5E:
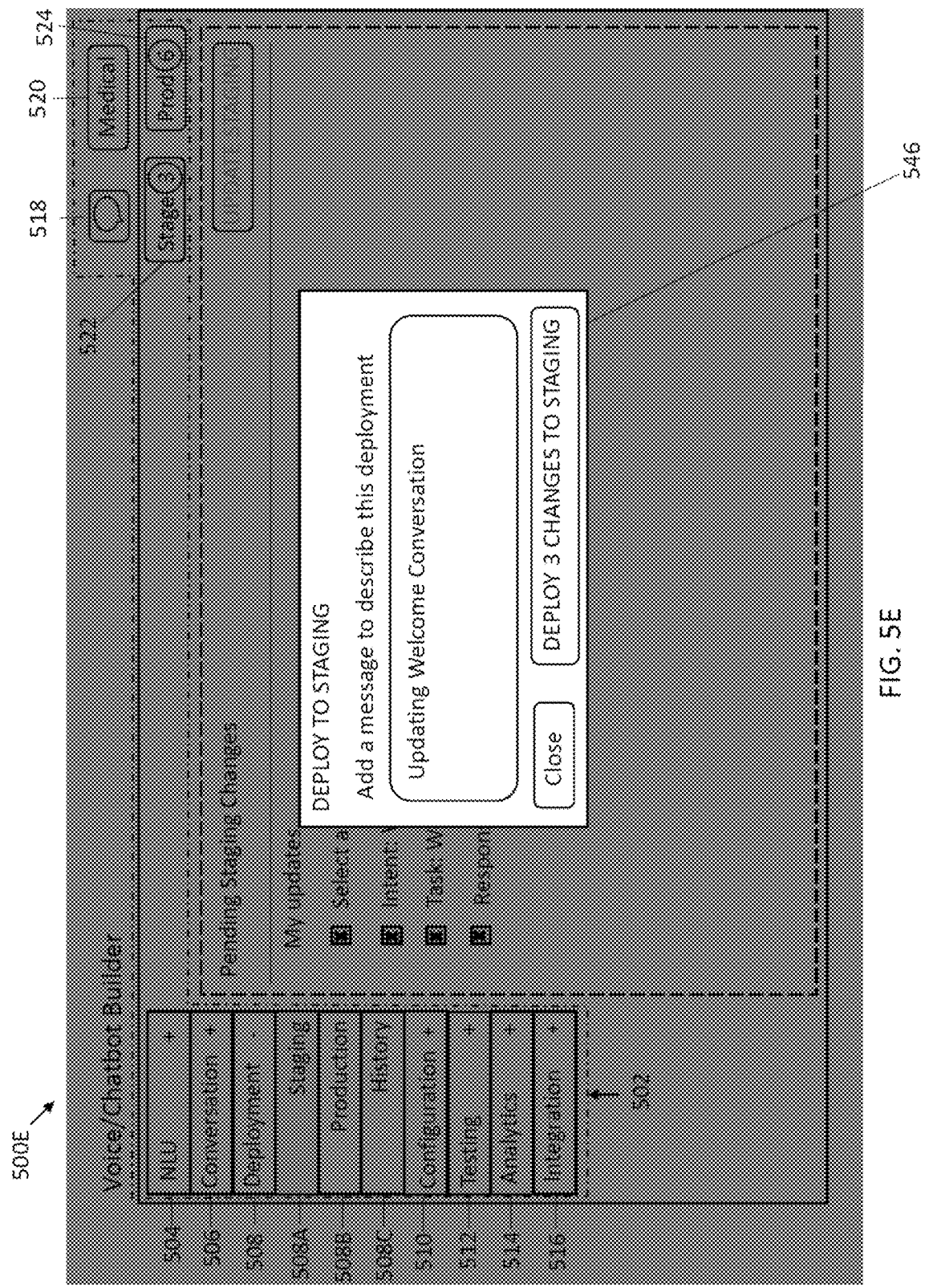
Figure 5F:
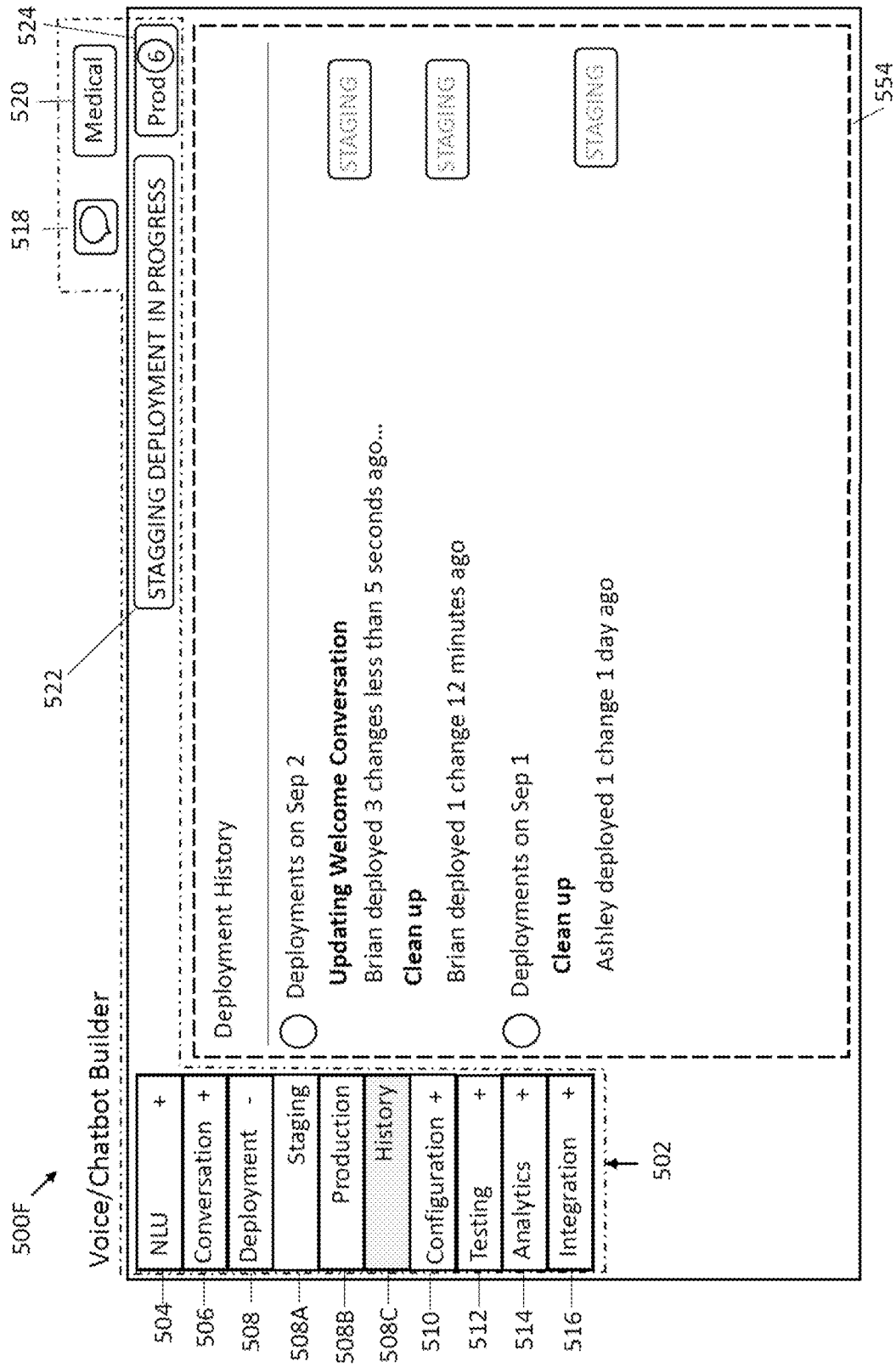

Once conversation(s) 400 are built, voice/chatbot builder system 102 enables developers to stage and deploy the conversations to voice/chatbot applications. FIGS. 5D-5F illustrate various staging interfaces 500D-500F of a voice/chatbot builder system 102 in accordance with some embodiments. With reference to FIG. 5D, staging interface 500D provides a staging window 546. Staging window 546 includes a staging list 548 of all built, but not-staged or deployed conversations and the components thereof. In the example of FIG. 5D, the various components of a "welcome" conversation are shown. A developer may select the components of conversations and click the update staging link 550 to deploy the components. Doing so may cause a message window 546 to appear in the staging window 500E as illustrated in FIG. 5E. This window allows the developer to provide notes explaining the components that are deployed to staging. When components are deployed to staging, an event may be recorded to a development history window 554 that indicates when updates occurred, who made the changes, which changes were made, etc. The voice/chatbot builder system 102 also allows for multiple conversations and components (intents, phrases, tasks, and responses), e.g., those shown on component list 562 illustrated in FIG. 5I, to be deployed to staging at once.

Figure 5G:
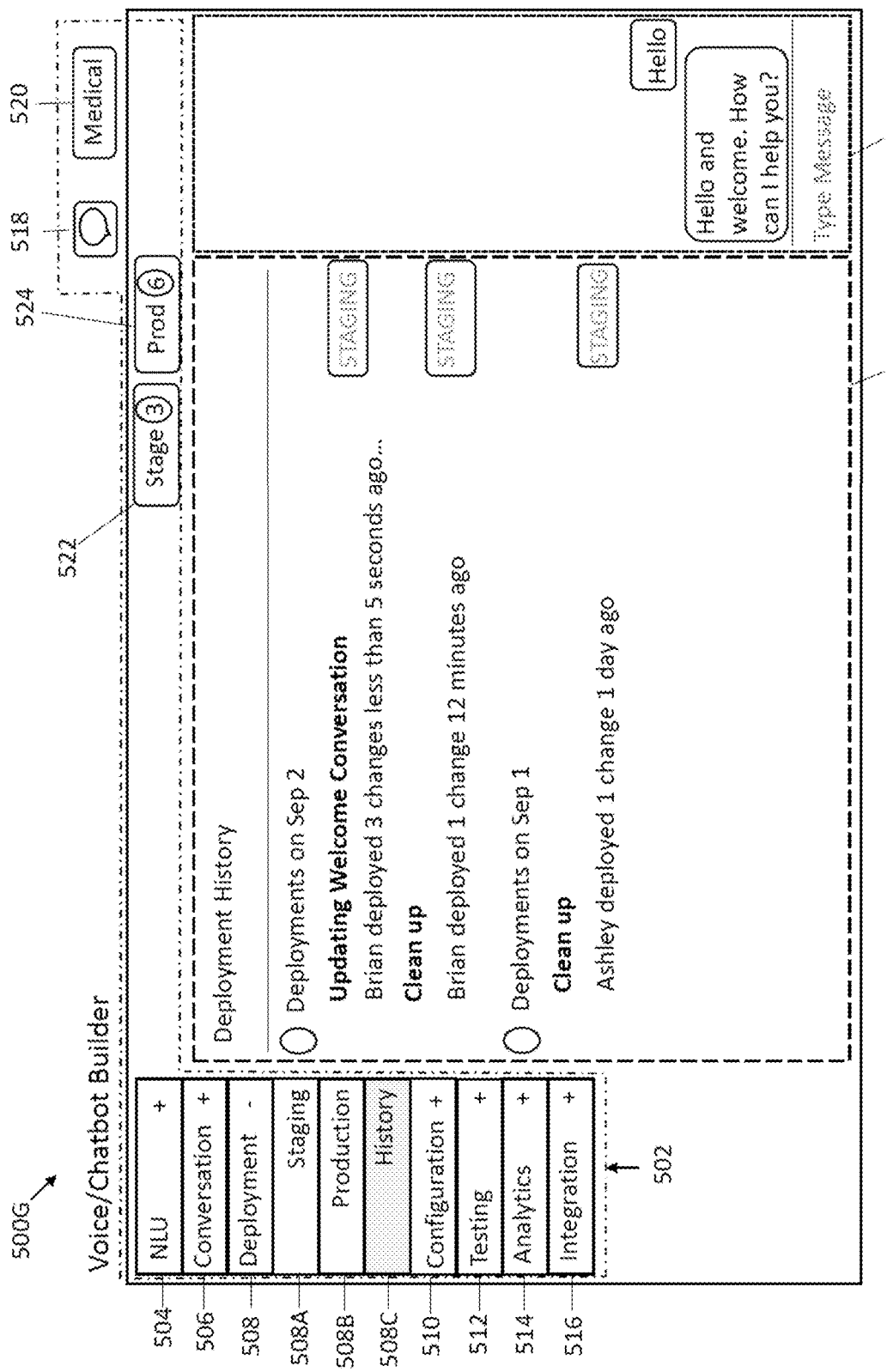
FIG. 5G is voice/chatbot interface of a voice/chatbot builder system in accordance with some embodiments.
Figure 5H:
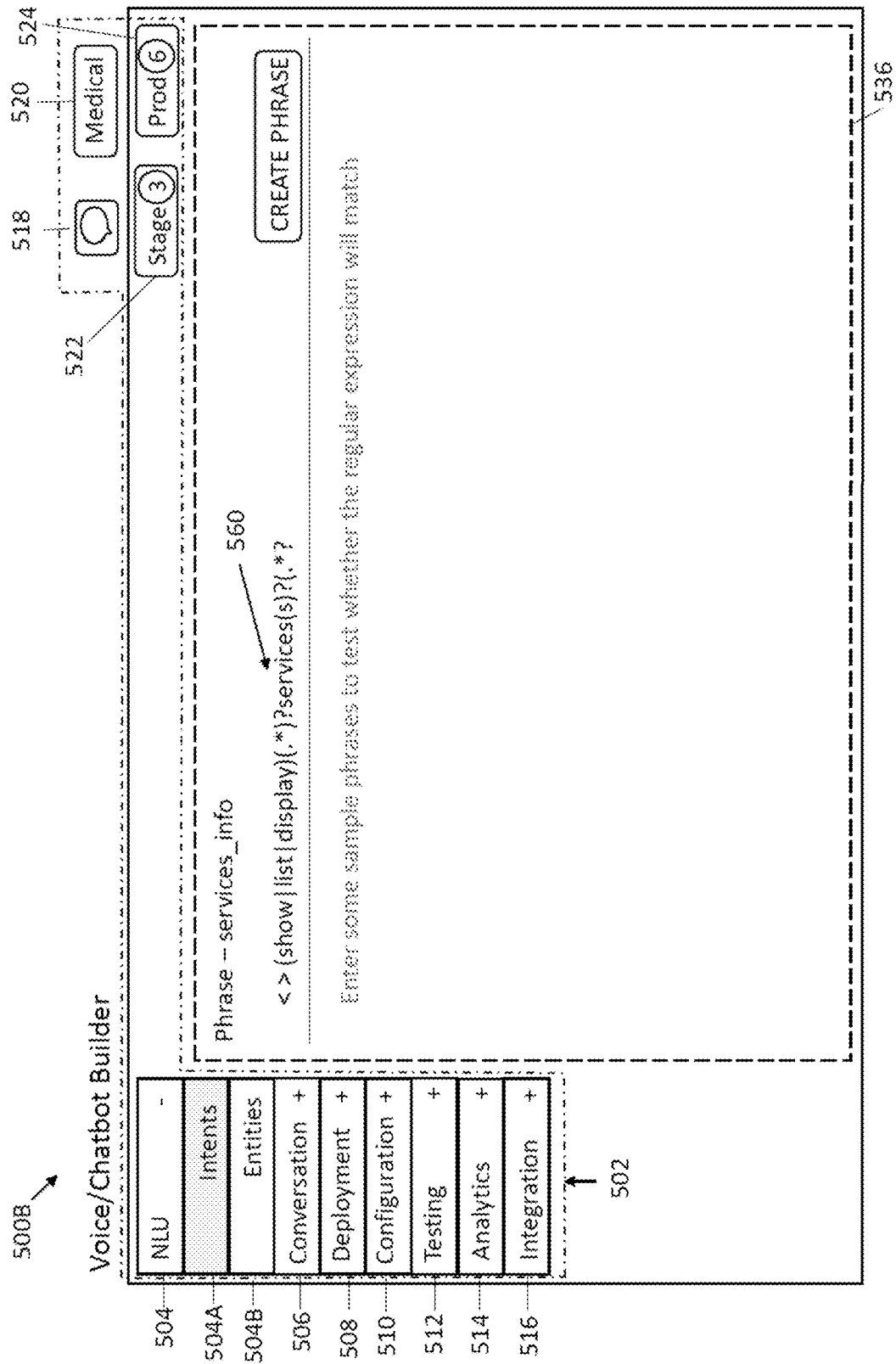
FIG. 5H is another phrase-defining interface of a voice/chatbot builder system in accordance with some embodiments.
Figure 5I:
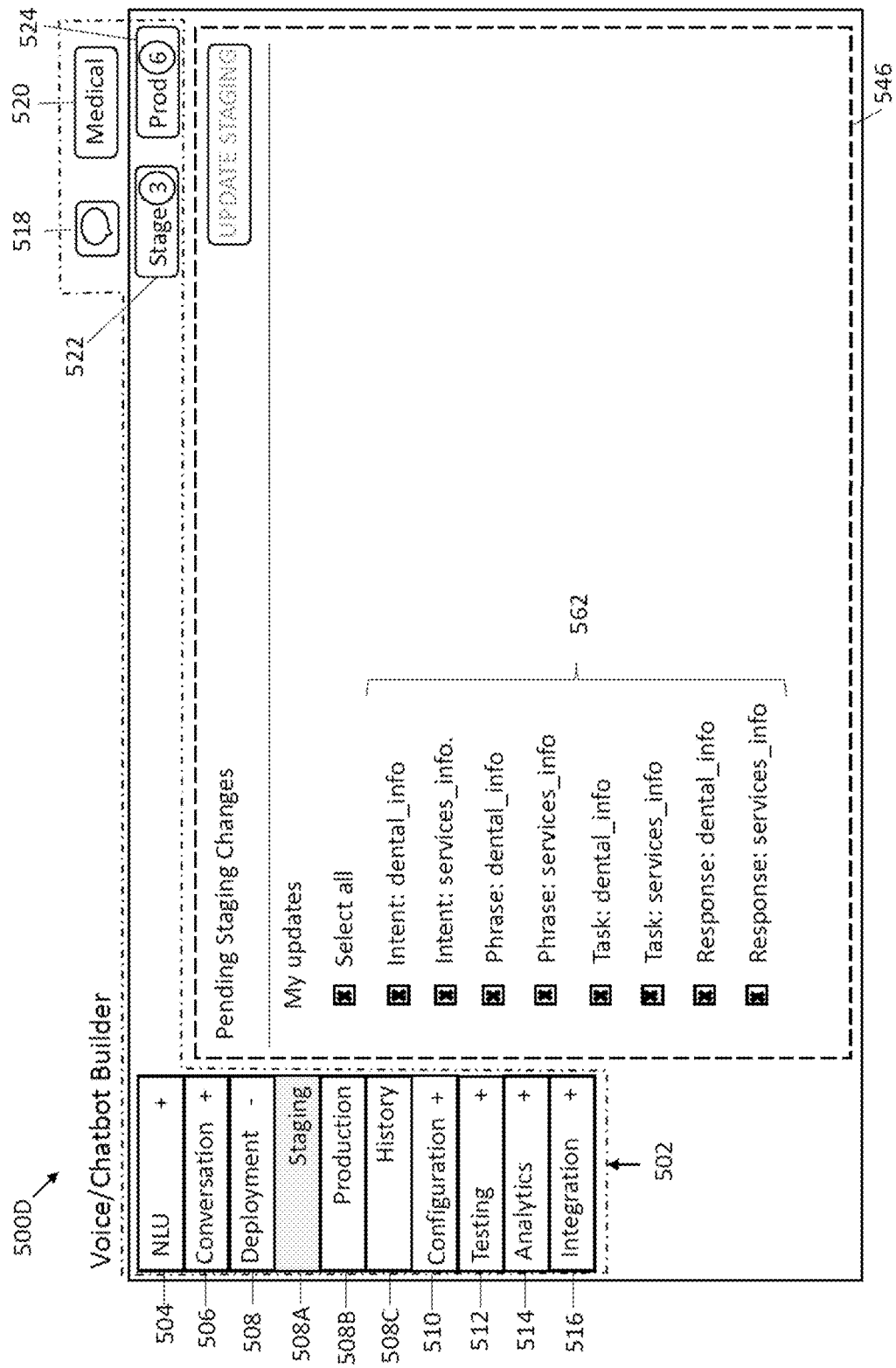
FIG. 5I is another staging interface of a voice/chatbot builder system in accordance with some embodiments.

After a conversation has been deployed to staging, voice/chatbot builder system 102 enables developers to interact and/or test the new conversation by, e.g., clicking the voice/chatbot icon 518. Clicking the voice/chatbot icon 518 may open a voice/chatbot interface 500G window 558 as illustrated in FIG. 5G in accordance with some embodiments. As can be seen, this chat window allows a developer to enter words and phrases that, once recognized as a user intent by the NLP ML algorithm, returns the task and/response associate the intent of the conversation. This allows developer to test newly deployed conversations.

Staging, production, and history links are provided at 508A, 508B, and 508C, respectively.

In accordance with some embodiments, even greater improved efficiency and effectiveness of voice/chatbot application and builder systems are realized when linking multiple conversations within the interface provided by voice/chatbot builder system 102. An example of contextually-connected conversations 400A-400E is illustrated in the conversation building window 542 of the FIG. 5J. Conversation 400A is shown as a "inquiry for medical services" conversation that, in response to the determination that a user is interested finding out what medical services are provided, conversation 400A returns a list of provided services, e.g., dental, vison, and laboratory works (400B-400D). Anticipating that the presentation of such services to a user may lead to further utterances containing a user intent (e.g., scheduling of services), developers can both create additional conversations regarding the scheduling of these services (e.g., 400B for dental services, 400C for vision, and 400D for laboratory) and link these conversations to the originating conversation 400A. These links, illustrated at 408 may indicate that conversations 400B-400D should be contextually linked to the conversation 400A. For example, a user may first inquire about medical services as a specific location in conversation 400A and then inquire about scheduling one of the medical services, but may perhaps not expressly state that the service should be scheduled at the location inquired about in 400A. By linking the conversations, the voice/chatbot application recognizes the context provided by conversation 400A and can return a response based on this context, e.g., by having a subsequent conversation provide a scheduling response related to the particular location inquired about in conversation 400A. Additionally, the voice/chatbot application builder may allow for the prioritization of the pairing of NLP ML determined intents and a conversation's 400 identified intent(s) 402 where the conversations are contextually linked.

Figure 5J:
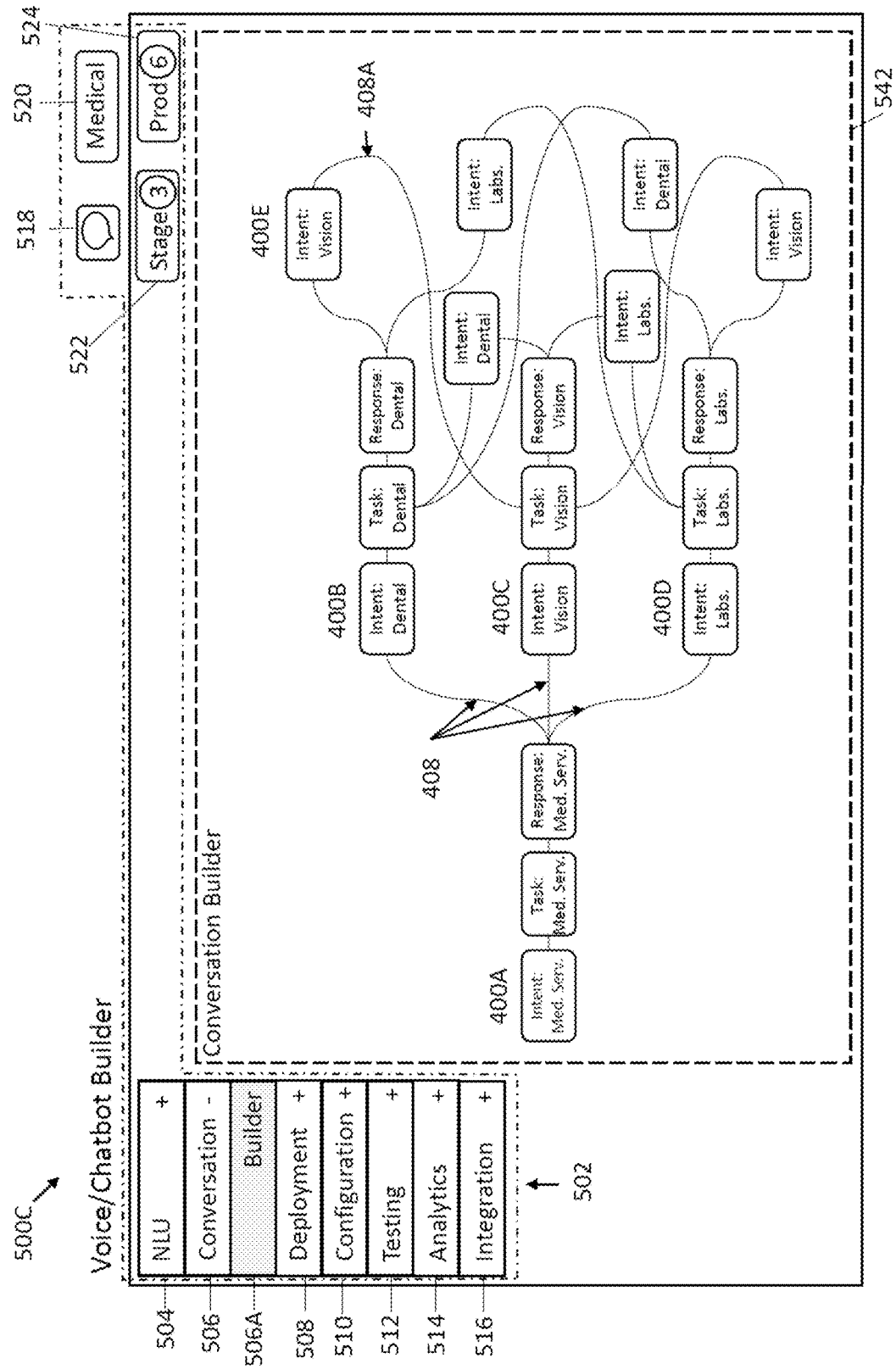
FIG. 5J is another conversation building interface of a voice/chatbot builder system in accordance with some embodiments.

FIG. 5J further illustrates that conversations may also be linked in a more flexible manner. For example, link 408A links intent 400E to the task of conversation 400C. For example, in conversation 400B a user may have scheduled a dental appointment. After scheduling this event, a user may provide an utterance intended to schedule another appointment, e.g., an eye appointment. However, the user's utterance may be shorted (e.g., "OK, now optometrist")

leading to difficulty in determining the user's intent. However, if such an utterance follows the scheduling of a dentist appointment in conversation 400B, the system may recognize (or assume) that the user like intends to schedule an optometry appoint. In response, the system links this intent 400E to the task and response of conversation 400C. Such flexible linking between conversations allows for more efficient and effective conversations with users. Additionally, the graphical linking of these conversations is converted by the voice/chatbot builder system 102 into the code that is executed by a processor running a voice/chatbot application. In this conversion, what may be otherwise complex, redundant code can be eliminated, thereby saving system storage and computing resources.

Figure 5K:
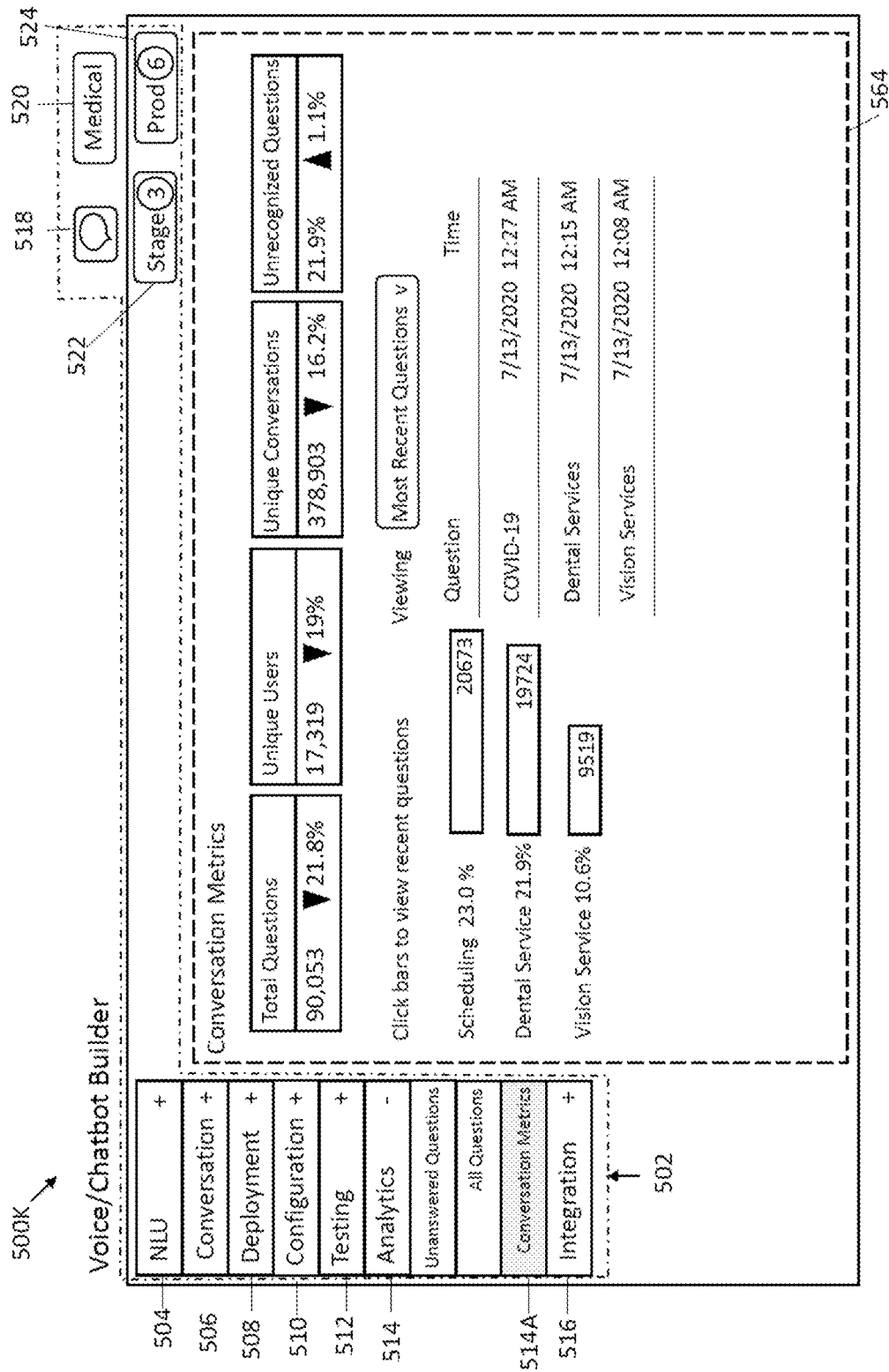
FIG. 5K is an analytics interface of a voice/chatbot builder system in accordance with some embodiments.

In accordance with some embodiments, an analytics section 500K having an analytics interface 564 of a voice/chatbot builder system 102 is illustrated in FIG. 5K. By selecting the conversation metrics 514A, a developer may be presented with a host of analytics related to the voice/chatbot application, including, e.g., the total number of questions asked by (or from) users, the number of unique users and conversations, the percentage of user questions for which an intent could not be identified by the NLP ML algorithm, graphs related to the most recent questions, and tables showing the most recent questions.

Figure 6:
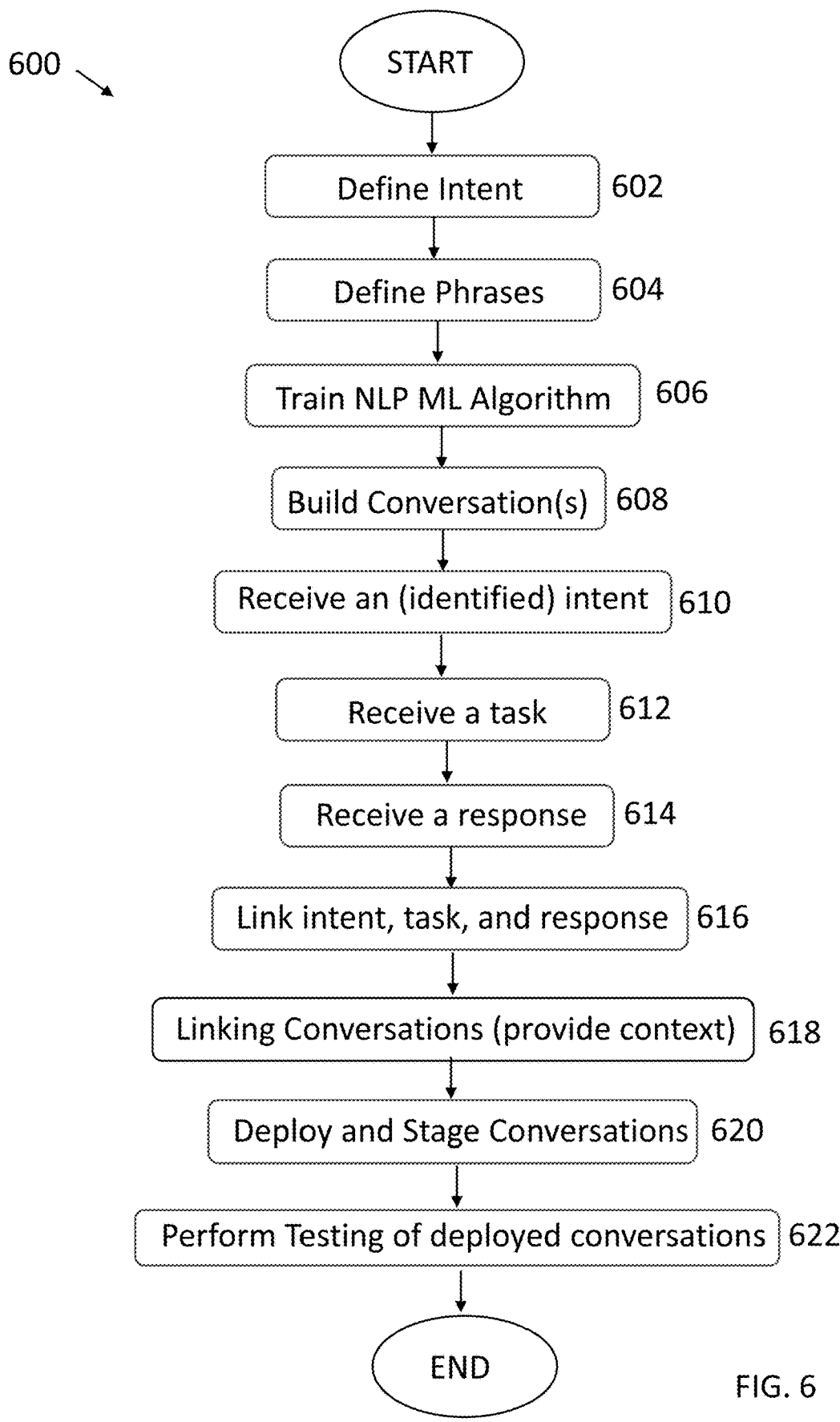
FIG. 6 is a method of building a voice/chatbot conversation in accordance with some embodiments.

In accordance with some embodiments, FIG. 6 is a method 600 of building a voice/chatbot conversation. The method 600 may be employed by a voice/chatbot builder system 102 and employ additional steps as performed by system 102 as described herein. The method 600 may start at block 602 in which a developer defines an intent. This intent is used for matching with an intent as determined by an NLP ML algorithm to select which conversation (e.g., task and response) should be executed. The NLP ML may be provided with a list of defined phrase or other training data at block 604, which is used to train the NLP ML algorithm at block 606. With defined intents, a developer may build a conversation(s) at block 608. Building a conversation may comprise receiving an intent (which may be referred to as an identified intent) (block 610), receiving a task related to the intent (block 612), and receiving a response (block 614). The task may be executed by a voice/chatbot application or exported to a remote handler for processing. The response may take data from the processed task in order to provide an appropriate response to a user of the voice/chatbot application.

At blocks 616-618 the developer may link both within and among conversations. This link contextually ties conversations to one another. Linking may further involve determining a priority among contextually related conversations, and prioritizing contextually related conversations over non-contextually related conversations. Built conversations may be deployed (block 620) and tested (block 622). The testing may involve regression testing and/or interacting with a voice/chatbot simulator.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device comprising: a non-transitory computer readable medium storing instructions, and at least one processor communicatively coupled to the non-transitory computer readable medium, wherein the at least one processor is configured to execute the instructions to:
receive an identified intent that is determined based on a machine learning model and an utterance of a user;
receive a task related to the identified intent;
receive a response related to both the identified intent and the task;
link the identified intent, task, and response to form a first conversation;
build a second conversation based on the machine learning model and the first conversation, wherein the second conversation is built based on:
determining, after the response to the utterance is received, an anticipated intent of the user based on the machine learning model and the identified intent,
linking the first conversation and the second conversation based on the identified intent and the anticipated intent,
establishing a contextual connection between the first conversation and the second conversation based on the linking of the first conversation and the second conversation,
obtaining, after the contextual connection is established and after the anticipated intent is determined, a second utterance of the user,
determining a second intent based on the machine learning model, the second utterance, and the contextual connection,
determining that the second intent matches the anticipated intent of the user,
determining a second task related to the second intent,
receiving a second response related to both the second intent and the second task, and
linking the second intent, second task, and second response to form the second conversation;

establish contextual connections between the first conversation and a plurality of contextually connected conversations;
establish non-contextual connections between the first conversation and a plurality of non-contextually connected conversations; and
prioritize the plurality of contextually connected conversations over the plurality of non-contextually connected conversations, when the identified intent is determined.

2. The system of claim 1, wherein the at least one processor is further configured to execute the instructions to: determine the identified intent based on: the machine learning model, the plurality of contextually connected conversations, and the plurality of non-contextually connected conversations.

3. The system of claim 1, wherein the at least one processor is further configured to execute the instructions to perform regression testing of the first conversation and the second conversation.

4. The system of claim 1, where the at least one processor is further configured to execute the instructions to define a plurality of intents.

5. The system of claim 4, wherein the identified intent is selected from among the plurality of intents.

6. The system of claim 4, wherein the anticipated intent is selected from among the plurality of intents.

7. The system of claim 6, wherein the at least one processor is further configured to execute the instructions to access training data in response to the receipt of the identified intent.

8. The system of claim 1, wherein the at least one processor is further configured to execute the instructions to, in response to the receipt of the task, export data related to the task to a remote handler.

9. A method comprising:
receiving an identified intent that is determined based on a machine learning model and an utterance of a user;
receiving a task related to the identified intent;
receiving a response related to both the identified intent and the task;
linking the identified intent, task, and response to form a first conversation; and
building a second conversation based on the machine learning model and the first conversation, wherein the second conversation is built based on:
determining, after the response to the utterance is received, an anticipated intent of the user based on the machine learning model and the identified intent,
linking the first conversation and the second conversation based on the identified intent and the anticipated intent,
establishing a contextual connection between the first conversation and the second conversation based on the linking of the first conversation and the second conversation,
obtaining, after the contextual connection is established and after the anticipated intent is determined, a second utterance of the user,
determining a second intent based on the machine learning model, the second utterance, and the contextual connection,
determining that the second intent matches the anticipated intent of the user,
determining a second task related to the second intent,
receiving a second response related to both the second intent and the second task, and
linking the second intent, second task, and second response to form the second conversation;
establishing contextual connections between the first conversation and a plurality of contextually connected conversations;
establishing non-contextual connections between the first conversation and a plurality of non-contextually connected conversations; and
prioritizing the plurality of contextually connected conversations over the plurality of non-contextually connected conversations, when the identified intent is determined.

10. The method of claim 9, further comprising:
determining the identified intent based on: the machine learning model, the plurality of contextually connected conversations, and the plurality of non-contextually connected conversations.

11. The method of claim 9, further comprising:
defining a plurality of intents from which the identified intent is selected.

12. The method of claim 9, further comprising:
exporting data related to the task to a remote handler.

13. A non-transitory computer readable medium having instructions stored thereon, wherein the instructions, when executed by at least one processor, cause a device to perform operations comprising:
receiving an identified intent that is determined based on a machine learning model and an utterance of a user;
receiving a task related to the identified intent;
receiving a response related to both the identified intent and the task;
linking the identified intent, task, and response to form a first conversation flow; and
building a second conversation flow based on the machine learning model and the first conversation flow, wherein the second conversation flow is built based on:
determining, after the response to the utterance is received, an anticipated intent of the user based on the machine learning model and the identified intent,
linking the first conversation flow and the second conversation flow based on the identified intent and the anticipated intent,
establishing a contextual connection between the first conversation flow and the second conversation flow based on the linking of the first conversation flow and the second conversation flow,
obtaining, after the contextual connection is established and after the anticipated intent is determined, a second utterance of the user,
determining a second intent based on the machine learning model, the second utterance, and the contextual connection,
determining that the second intent matches the anticipated intent of the user,
determining a second task related to the second intent,
receiving a second response related to both the second intent and the second task, and
linking the second intent, second task, and second response to form the second conversation flow;
establishing contextual connections between the first conversation and a plurality of contextually connected conversations;
establishing non-contextual connections between the first conversation and a plurality of non-contextually connected conversations; and prioritizing the plurality of contextually connected conversations over the plurality of non-contextually connected conversations, when the identified intent is determined.

14. The non-transitory computer readable medium of claim 13, having further instructions stored thereon, wherein the instructions, when executed by at least one processor, cause the device to further perform operations comprising:
determining the identified intent based on: the machine learning model, the plurality of contextually connected conversations, and the plurality of non-contextually connected conversations.

* * * * *